United States Patent
Klemm et al.

(10) Patent No.: US 12,521,762 B2
(45) Date of Patent: Jan. 13, 2026

(54) ULTRASONIC TRANSDUCER FOR TRANSMITTING AND/OR RECEIVING ULTRASONIC WAVES

(71) Applicant: ENDRESS+HAUSER SICK GMBH+CO. KG, Ottendorf-Okrilla (DE)

(72) Inventors: Markus Klemm, Waldkirch (DE); Eric Starke, Waldkirch (DE)

(73) Assignee: ENDRESS+HAUSER SICK GMBH+CO. KG, Ottendorf-Okrilla (DE)

( * ) Notice: Subject to any disclaimer, the term of this patent is extended or adjusted under 35 U.S.C. 154(b) by 1002 days.

(21) Appl. No.: 17/675,381

(22) Filed: Feb. 18, 2022

(65) Prior Publication Data
US 2022/0288636 A1    Sep. 15, 2022

(30) Foreign Application Priority Data

Mar. 11, 2021   (EP) .................................... 21162099

(51) Int. Cl.
*B06B 1/06* (2006.01)
(52) U.S. Cl.
CPC .................................. *B06B 1/067* (2013.01)
(58) Field of Classification Search
CPC .................................................. B06B 1/067
See application file for complete search history.

(56) References Cited

U.S. PATENT DOCUMENTS

| 8,904,881 B2 | 12/2014 | Sonnenberg et al. |
| 10,627,511 B2 | 4/2020 | Lee |
| 2004/0200056 A1* | 10/2004 | Suzuki ................... G10K 11/02 29/25.35 |
| 2012/0007471 A1* | 1/2012 | Tai ........................... B06B 1/067 310/334 |
| 2019/0302063 A1* | 10/2019 | Hadimioglu ........... G01N 29/28 |
| 2020/0315576 A1* | 10/2020 | Kim ......................... A61B 8/00 |
| 2020/0353645 A1* | 11/2020 | Massa .................... G01N 29/02 |

(Continued)

FOREIGN PATENT DOCUMENTS

| DE | 102007010500 A1 | 9/2008 |
| DE | 102007037088 A1 | 2/2009 |
| DE | 102008055123 B3 | 7/2010 |

(Continued)

OTHER PUBLICATIONS

English Translation of DE 102007037088 (Year: 2007).*
European Search Report for corresponding European Application No. 21162099.2 issued on Aug. 10, 2021.

*Primary Examiner* — Bryan P Gordon
(74) *Attorney, Agent, or Firm* — Nath, Goldberg & Meyer; Jerald L. Meyer; Ilirian Durri

(57) ABSTRACT

The invention relates to an ultrasonic transducer (1) for transmitting and/or for receiving ultrasonic waves, comprising a backing layer (2), a matching layer (A) for impedance matching to the fluid (F), a piezoelectric element (4) arranged between the backing layer (2) and the matching layer (A), a first electrode (3a) between the support layer (2) and the piezo element (4) providing a first electrical contact (K1) of the piezo element (4), wherein the matching layer (A) is formed by a flexible printed circuit board (Lp) and the flexible printed circuit board (Lp) provides a second electrical contact (K2) of the piezo element (4).

9 Claims, 3 Drawing Sheets

(56) References Cited

U.S. PATENT DOCUMENTS

Figure 1:
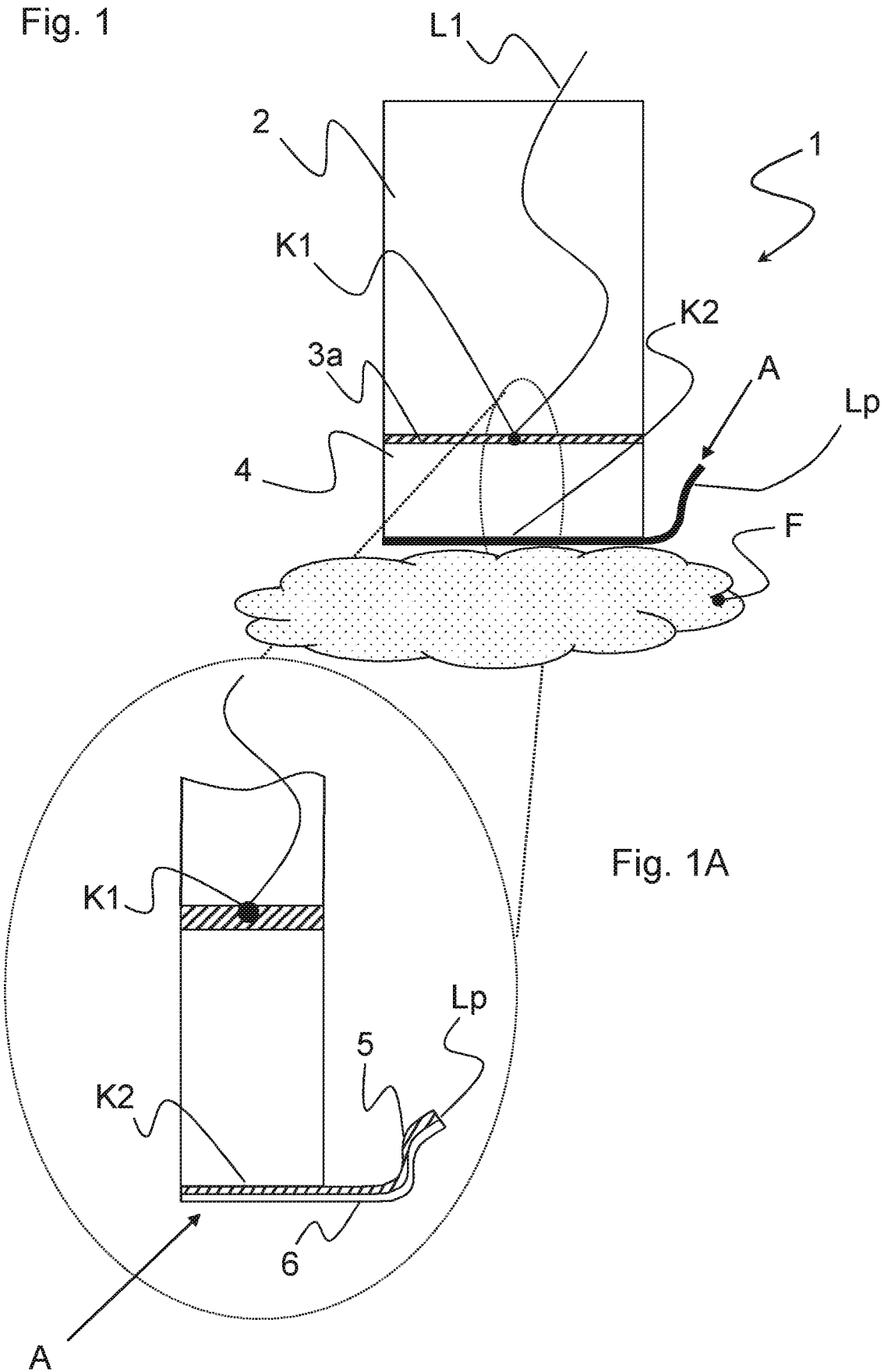

2021/0048323 A1 2/2021 Ditas et al.

FOREIGN PATENT DOCUMENTS

| DE | 102009046148 A1 | 5/2011 |
| DE | 102009046149 A1 | 5/2011 |
| DE | 102009053535 A1 | 5/2011 |
| DE | 102010030189 A1 | 12/2011 |
| EP | 0119855 B2 | 6/1992 |

* cited by examiner

Fig. 2
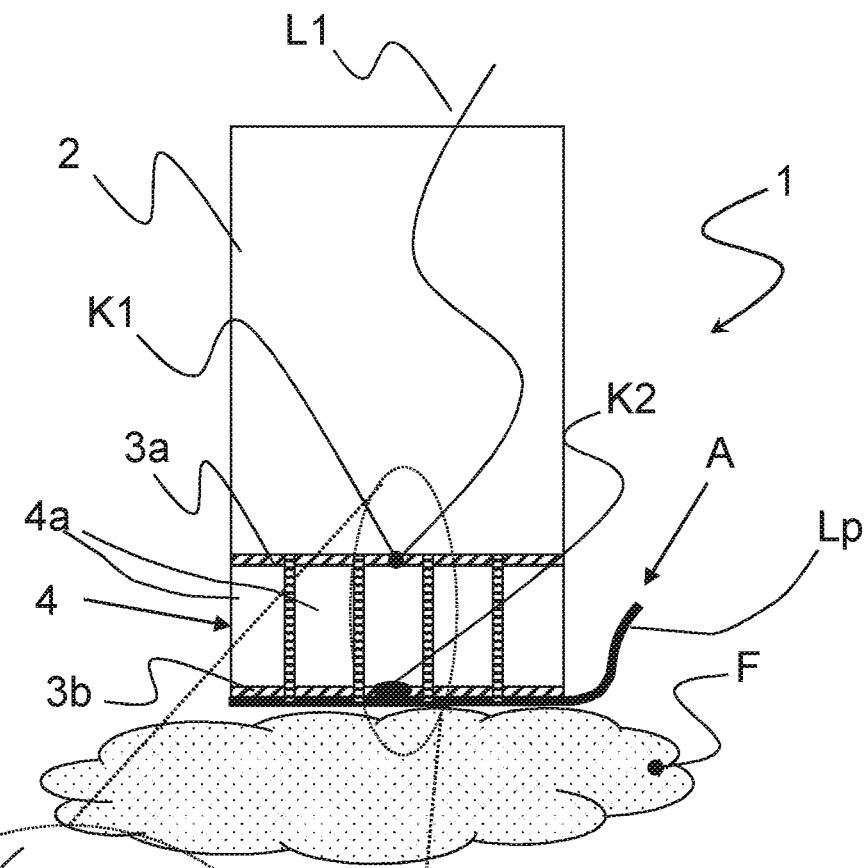
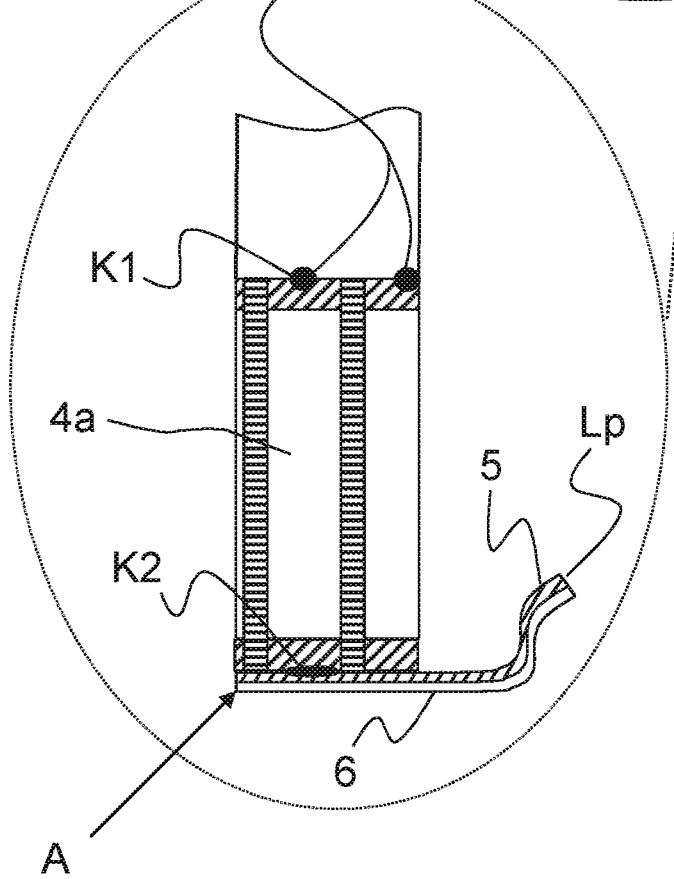
Fig. 2A

ULTRASONIC TRANSDUCER FOR TRANSMITTING AND/OR RECEIVING ULTRASONIC WAVES

The invention relates to an ultrasonic transducer for transmitting and/or receiving ultrasonic waves in a fluid, comprising a backing layer, a matching layer for impedance matching to the fluid, a piezoelectric element arranged between the backing layer and the matching layer, a first electrode between the backing layer and the piezo element, which provides a first electrical contact of the piezo element.

In order to determine the flow velocity of a fluid in a pipe, preferably a circular pipe, there is, in addition to various physical principles, the use of ultrasonic waves that are emitted into the pipe. By means of the difference in time-of-flight of ultrasound wave packets travelling with and against the flow, the flow velocity of the flowing fluid and thus the flow can be determined.

In this case, ultrasonic wave packets are emitted or received by one of two opposing ultrasonic transducers. The ultrasonic transducers are arranged opposite each other in the pipe wall with a distance in the direction of flow. They define a measurement path which is therefore at an angle unequal to 90° to the flow of the fluid.

The ultrasonic wave packets propagating through the fluid are accelerated in the direction of flow and decelerated against the direction of flow. The resulting time-of-flight difference is used to calculate a mean fluid velocity taken geometric variables into account and the fluid velocity leads to determination of the flow rate of the flowing fluid.

An important and demanding field of application is gas meters for natural gas pipelines, where, due to the immense quantities of gas and the value of the raw material, even the smallest deviations in measurement accuracy can lead to clearly noticeable differences in value between the quantities actually transported and those measured. This might lead to high monetary differences.

Since gases generally have a much lower acoustic impedance compared to a solid, it is very important for the measurement of gases by means of ultrasonic technology that the ultrasonic waves of the ultrasonic transducers used for measurement are coupled into the gas without large energy losses. This means that if the ultrasonic waves of the ultrasonic transducers are coupled into the gas with a high energy loss, a measurement accuracy of the ultrasonic transducer would be greatly reduced.

Therefore, an optimised coupling of the ultrasonic waves of the ultrasonic transducer into the gas represents an important property of the ultrasonic transducer in order to fulfil the required measuring accuracy of the ultrasonic transducer in this area of large gas volume measurement.

A basically suitable ultrasonic transducer is known, for example, from EP 0 119 855 B2 and basically consists of the main elements listed in the following order:
- a backing layer, which is usually made of an epoxy-based material;
- a first electrode arranged next to the backing layer;
- a piezo element coupled to the first electrode and used to generate an ultrasound wave to be emitted;
- a second electrode which is coupled to the piezoelectric element on the other side of it and which, together with the first electrode, applies an electrical voltage to the piezoelectric element so that the piezoelectric element is excited to vibrate and to generate the ultrasound;
- and a matching layer, which is arranged on the second electrode and enables impedance matching between the piezo element and the fluid, e.g. gas, in order to couple the generated ultrasound into the gas or out of the gas.

In the production of the aforementioned ultrasonic transducer, the different processing steps of producing the layers with thicknesses which are in the range of 100 to 500 µm, represent a high effort, so that high production costs are incurred.

In addition, an exact reproducibility of the ultrasonic transducer can only be guaranteed with great effort and thus costs. Furthermore, electrical contacting of the piezo element via the first and second electrodes is difficult to carry out due to the separate process steps, which in turn represents a negative factor for reproducibility.

Since the matching layer of the ultrasonic transducer is exposed to the fluid to be measured, an additional protective layer is provided for the matching layer in the known ultrasonic transducer, which on the one hand protects the matching layer from, for example, mechanical damage or contamination, but on the other hand deteriorates the impedance matching of the matching layer. To prevent deterioration, the protective layer must be made of a special composite material or be specially manufactured.

It is an object of the invention to provide an ultrasonic transducer for transmitting and/or receiving ultrasonic waves in a fluid, which can be manufactured simply and thus inexpensively.

The object is solved according to the inventive subject matter by an ultrasonic transducer for transmitting and/or receiving ultrasonic waves in a fluid, in particular a gas, comprises a backing layer, a matching layer for impedance matching to the fluid, a piezo element arranged between the backing layer and the matching layer, a first electrode between the support layer and the piezoelement, wherein the first electrode provides a first electrical contacting of the piezoelement, and wherein the matching layer is formed by a flexible printed circuit board and the flexible printed circuit board provides a second electrical contacting of the piezo-element.

This results in the technical advantage that the matching layer consisting of the flexible printed circuit board also forms a protective layer, so that no special composite material or no production of a special protective layer is required.

According to a preferred embodiment example, the flexible printed circuit board comprises at least one electrically conductive layer and at least one electrically non-conductive base layer, wherein the conductive layer of the flexible printed circuit board forms a second electrode for the second electrical contact. Advantageously, this means that the separate second electrode can be dispensed compared to the prior art, which makes it possible to reduce the costs of material in manufacturing the ultrasonic transducer.

Furthermore, according to a preferred embodiment, the conductive layer is divided into partial planes, whereby each partial plane forms a separate electrical contact. This enables simple electrical contacting of the side of the piezo element facing the fluid, which significantly simplifies the manufacturing process. In particular, the piezo element consists of several individual elements, each individual element having a respective separate contact with the flexible printed circuit board. This makes it advantageously simple to provide an ultrasonic transducer consisting of individual controllable individual elements, whereby the ultrasonic transducer is designed as a transducer array in which the individual elements can be operated separately.

Furthermore, the second contacting is designed in particular over the entire surface or at specific points, so that the manufacture of the ultrasonic transducer is simplified even further. In this case, 'full-surface contact' means that an entire electrical layer of the flexible printed circuit board is electrically connected to the piezo element by means of a contact paste, for example. 'Point contact' means that at least a selected point of the electrically conductive layer of the flexible printed circuit board is connected to the piezo element.

Preferably, the electrically conductive layer of the flexible printed circuit board is adapted to a structure of the piezoelectric element so that the flexible printed circuit board, which is formed as both a matching layer and a protective layer, has improved mechanical rigidity, wherein a shape of the flexible printed circuit board is more easily adaptable to a required shape of the ultrasonic transducer. In other words, the flexible printed circuit board can more easily absorb and compensate for slight deformations, such as bending, during the manufacture of the ultrasonic transducer, so that the accuracy of the manufacture of the ultrasonic transducer and thus the reproducibility on an industrial scale is ensured.

Since the flexible printed circuit board as a matching layer is in direct contact with the fluid to be measured, mostly gas, the flexible printed circuit board advantageously has a base layer consisting of polyimide, which on the one hand provides an acoustic impedance between the acoustic impedance of the piezo element and the acoustic impedance of the gas and on the other hand has a high insensitivity to environmental influences, in particular abrasion and contamination.

Since the acoustic impedance of the flexible printed circuit board is in the range between the acoustic impedance of the piezo element and the acoustic impedance of the fluid, an easier impedance matching between the ultrasonic transducer and the fluid to be measured is possible. Advantageously, a thickness of the flexible printed circuit board corresponds in particular to approximately 1/10 to 1/4 of the ultrasonic wavelength, preferably approximately in a range of approximately 100 μm to 300 μm. Here, the mentioned ultrasonic wavelength corresponds to an ultrasonic wavelength that is transmitted within the flexible printed circuit board at a working frequency of the ultrasonic transducer.

Furthermore, according to a preferred embodiment, the flexible printed circuit board has a protective layer, in particular of copper, steel, gold or aluminium, on the surface facing away from the piezo element, whereby the protective property of the flexible printed circuit board can be improved.

To further simplify the manufacture of the ultrasonic transducer, the flexible printed circuit board also forms a terminal lug for an electrical connection. This makes it easier to make electrical contact with the flexible printed circuit board during the manufacture of the ultrasonic transducer.

Preferred embodiments and further embodiments as well as further advantages of the invention can be found in the subordinate claims, the following description and the drawings.

In the following, the invention is explained in detail by means of an embodiment with reference to the drawing. In the drawing it is shown:

FIG. 1 a schematic sectional view of a preferred embodiment of an ultrasonic transducer according to the inventive subject matter;

FIG. 1A enlarged, schematic detailed view of the embodiment from FIG. 1;

FIG. 2 a schematic sectional view of a further preferred embodiment of the ultrasonic transducer according to the inventive subject matter;

FIG. 2A an enlarged, schematic detailed view of the embodiment of FIG. 2; and

Figure 3:
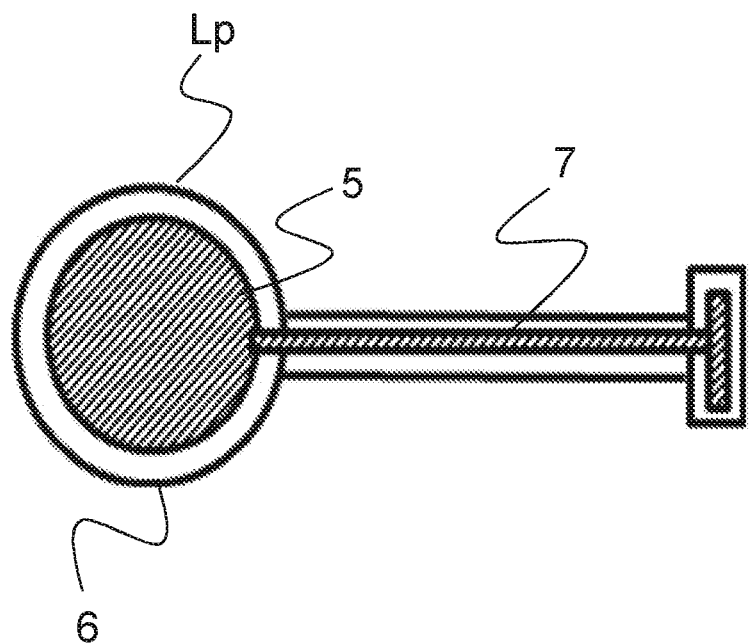

FIG. 3 a schematic representation of a preferred embodiment of a flexible printed circuit board of the ultrasonic transducer according to the inventive subject matter.

FIG. 1 shows a schematic sectional view of a preferred embodiment of an ultrasonic transducer 1 according to the invention, which can be used, for example, to measure a physical quantity of a fluid F, in particular a gas.

The ultrasonic transducer 1 according to the invention has a backing layer 2 and serves to minimise ultrasonic radiation on a side of the ultrasonic transducer 1 facing away from the fluid F and to reduce any resonance of a piezo element described in more detail later. The backing layer 2 is preferably made of epoxy-based material.

A first electrode 3a is arranged on the backing layer 2, which is typically formed as a thin layer of, for example, silver, tin bronze (CuSn) or the like. A thickness of the first electrode 3 is preferably less than 10 μm.

A piezoelectric element 4, whose thickness resonance corresponds to a desired frequency of an ultrasound to be emitted, which is used for the measurements in the fluid F, is arranged at the first electrode 3a.

The first electrode 3a is thus provided between the backing layer 2 and the piezoelectric element 4 and provides a first electrical contact K1 of the piezoelectric element 4, wherein this side of the piezoelectric element 4 facing the backing layer 2 is connected to a voltage source, which is not shown, by means of a schematically shown line L1 via the first electrical contact K1.

On a side of the piezo element 4 facing away from the first electrode 3a, a matching layer A is provided, which serves to impedance-match the fluid F. That is, in other words, the acoustic purpose of the matching layer A is to minimise an impedance difference between the acoustic impedance of the fluid F into which the ultrasound is to be radiated and the acoustic impedance of the piezo element 4, so that a so-called impedance jump between the ultrasonic transducer 1 and the fluid F is not too large. This allows energy to be effectively transferred into the fluid F so that a more accurate measurement is possible.

According to the invention, the matching layer A is formed by a flexible printed circuit board Lp, which also provides a second electrical contact K2 of the piezo element 4.

The side of the piezo element 4 facing the fluid F is also connected to the voltage source, not shown, so that an electrical voltage can be applied to the piezo element 4 through the first electrical contact K1 by means of the first electrode 3a and through the second electrical contact K2 by means of the flexible printed circuit board Lp, in order to cause the piezo element 4 to oscillate and thus to generate ultrasonic waves.

As shown in FIG. 1, the flexible printed circuit board Lp is in direct contact with the fluid F, so that the flexible printed circuit board Lp is both the matching layer A and a protective layer for the ultrasonic transducer 1. This can reduce a number of components to be used, so that part costs and manufacturing costs can be reduced by a simplified manufacturing process.

FIG. 1A shows an enlarged schematic detail view of the preferred embodiment of the ultrasonic transducer 1 described in detail in FIG. 1, wherein the flexible printed circuit board Lp comprises in particular at least one electrically conductive layer 5 and at least one electrically non-conductive base layer 6. In this case, the conductive layer 5 of the flexible printed circuit board Lp forms a second electrode for the second electrical contact K2 of the piezo element 4 and the electrically non-conductive base layer 6 forms a matching and protective layer for the ultrasonic transducer 1. Preferably, the conductive layer 5 of the flexible printed circuit board Lp can be, for example, a conductive path of the flexible printed circuit board Lp consisting of copper.

In other words, the conductive path of the flexible printed circuit board Lp acts as a second electrode for the piezoelectric element 4 so that an electric voltage can be applied to the piezoelectric element 4 via the first electrode 3a and the conductive layer 5 of the flexible printed circuit board Lp.

As already mentioned, the base layer 6 of the flexible printed circuit board Lp facing the fluid F serves as a matching layer A and at the same time as a protective layer for the ultrasonic transducer 1, whereby the base layer 6 is advantageously formed from polyimide, so that on the one hand it enables good impedance matching to gases and on the other hand has a high insensitivity to, for example, mechanical or chemical abrasion or contamination.

FIG. 2 shows a schematic sectional view of a further preferred embodiment of an ultrasonic transducer 1 according to the invention, wherein the same components as in the embodiment shown in FIG. 1 have the same reference numerals.

In this embodiment, a second electrode 3b is provided which, like the first electrode 3a, preferably consists of a thin layer, the thin layer being formed, for example, of silver, tin bronze (CuSn) or the like. The thickness of the second electrode 3b is preferably also less than 10 μm like the first electrode 3a. Here, the second electrode 3b is electrically connected to the conductive layer 5 of the flexible printed circuit board Lp, as shown in FIG. 2A, so that the flexible printed circuit board Lp together with the second electrode 3b provides the second electrical contact K2 of the piezo element 4.

The possibility of an electrical connection between the second electrode 3b and the conductive layer 5 of the flexible printed circuit board Lp simplifies the manufacture of the ultrasonic transducer 1. The manufacturing steps are easier to carry out and can be interchanged in the order in which they are carried out, namely first an arrangement of the second electrode 3b to the piezo element 4 and then an electrical connection between the second electrode 3b with the conductive layer 5 of the flexible printed circuit board Lp or first the electrical connection between the second electrode 3b and the conductive layer 5 of the flexible printed circuit board Lp and then the arrangement of the second electrode 3b together with the flexible printed circuit board Lp to the piezo element 4.

Furthermore, the piezo element 4 in this embodiment consists of several individual elements 4a, each of which has a separate contact (not shown in detail) with the flexible printed circuit board Lp. The conductive layer 5 of the flexible printed circuit board Lp is divided into partial areas for this purpose, whereby each partial area enables separate electrical contacting. This allows the piezo element 4 with its individual elements 4a to be used as a transducer array.

The conductive layer 5 of the flexible printed circuit board Lp may be adapted to a structure of the piezo element 4, so that the flexible printed circuit board Lp has an improved mechanical stiffness.

FIG. 3 shows a schematic representation of a preferred embodiment of the flexible printed circuit board Lp of the ultrasonic transducer 1 according to the invention, in which the flexible printed circuit board Lp has a circular main part which is attached to the piezoelectric element 4. Here, the flexible printed circuit board Lp is preferably attached to the piezo element 4 by soldering, gluing with electrically conductive or non-conductive adhesive, tacking with contact gel or contact grease, or welding.

In the illustrated embodiment of the flexible printed circuit board Lp, the flexible printed circuit board Lp has a terminal lug 7 for an electrical connection with the voltage source, not shown. As previously described, the printed circuit board Lp has the conductive layer 5 which forms the second contact K2 for the piezo element 4.

The terminal lug 7 is simply a part of the printed circuit board Lp and therefore also includes the base layer 6 and the conductive layer 5 via which the voltage from the voltage source can be supplied.

The conductive layer 5 is protected by the base layer 6 towards the outside, i.e. towards the side facing away from the piezoelectric element 4. In order to improve the protective properties of the base layer 6, it can be composed of several electrically non-conductive and electrically conductive layers, so that in particular a protective layer not shown, in particular made of copper, steel, gold or aluminium, is provided.

Despite all layers, the thickness of the flexible printed circuit board Lp preferably corresponds to about $\frac{1}{10}$ to $\frac{1}{4}$ of the ultrasonic wavelength and is in particular in a range of about 100 μm to 300 μm. Since a flexible printed circuit board already inherently has a base layer and a conductive layer necessary for the invention, the manufacturing process of the ultrasonic transducer 1 according to the invention is simplified, since several coating steps can be omitted.

LIST OF REFERENCE SIGNS

1 Ultrasonic transducer
2 Backing layer
3a First electrode
3b Second electrode
4 Piezo element
4a Individual elements of the piezo element
5 Conductive layer
6 Base layer
7 Connection flag
A Matching layer
F Fluid
K1 First contact
K2 Second contact
Lp Flexible printed circuit board
L1 Electrical line

The invention claimed is:

1. Ultrasonic transducer (1) for transmitting and/or receiving ultrasonic waves in a fluid (F), comprising
a backing layer (2),
a matching layer (A) for impedance matching to the fluid (F),
a piezoelectric element (4) arranged between the backing layer (2) and the matching layer (A),
a first electrode (3a) between the backing layer (2) and the piezoelectric element (4), which provides a first electrical contact (K1) of the piezoelectric element (4), and
a second electrode, said second electrode providing
a second electrical contact (K2) of the piezoelectric element (4), characterised in that the matching layer (A) is formed by a flexible printed circuit board (Lp), characterised in that the flexible printed circuit board (Lp) comprises at least one electrically conductive layer (5) and at least one electrically non-conductive base layer (6), characterised in that the conductive layer (5) of the flexible printed circuit board (Lp) is a conductive path of the flexible printed circuit board (Lp) consisting of copper, and characterised in that the conductive path of the flexible printed circuit board (Lp) acts as the second electrode.

2. Ultrasonic transducer (1) according to claim 1, characterised in that the flexible printed circuit board (Lp) is adapted to a structure of the piezoelectric element (4).

3. Ultrasonic transducer (1) according to claim 1, characterised in that the base layer (6) consists of polyimide.

4. Ultrasonic transducer (1) according to claim 1, characterised in that the flexible printed circuit board (Lp) has a protective layer, in particular of copper, steel, gold or aluminium, on the surface facing away from the piezoelectric element (4).

5. Ultrasonic transducer (1) according to claim 1, characterized in that the piezoelectric element (4) consists of several individual elements (4a), each individual element (4a) having a respective separate contacting with the flexible printed circuit board (Lp).

6. Ultrasonic transducer (1) according to claim 1, characterised in that the flexible printed circuit board (Lp) has a terminal lug (7) for an electrical connection.

7. Ultrasonic transducer (1) according to claim 1, characterised in that an acoustic impedance of the flexible printed circuit board (Lp) is in the range between an acoustic impedance of the piezoelectric element (4) and an acoustic impedance of the fluid (F).

8. Ultrasonic transducer (1) according to claim 1, characterised in that a thickness of the flexible printed circuit board (Lp) corresponds to about $\frac{1}{10}$ to $\frac{1}{4}$ of the ultrasonic wavelength, in particular in a range of about 100 μm to 300 μm.

9. Ultrasonic transducer (1) according to claim 1, characterised in that the flexible printed circuit board (Lp) is attached to the piezoelectric element (4) by soldering, gluing with electrically conductive or non-conductive adhesive, tacking with contact gel or contact grease or welding.

* * * * *